United States Patent [19]
Handelman

[11] Patent Number: 5,715,315
[45] Date of Patent: Feb. 3, 1998

[54] CATV SYSTEMS

[76] Inventor: Doron Handelman, 14 Hama'avak Street, Givataim 53520, Israel

[21] Appl. No.: 393,443

[22] Filed: Feb. 23, 1995

Related U.S. Application Data

[63] Continuation of Ser. No. 121,349, Sep. 15, 1993, Pat. No. 5,414,773.

[30] Foreign Application Priority Data

Aug. 19, 1993 [IL] Israel .......................... 106746

[51] Int. Cl.⁶ .......................... H04M 11/06; H04H 1/02; H04H 7/10; H04L 9/00
[52] U.S. Cl. .......................... 380/49; 380/9; 380/10; 380/18; 348/6; 348/8; 348/9; 348/10; 348/12; 455/5.1; 455/6.1; 455/6.2; 455/6.3
[58] Field of Search .......................... 348/6, 8, 9, 12, 348/10; 455/3.1, 5.1, 6.1, 6.3, 6.2; 380/10, 18, 19, 20

[56] References Cited

U.S. PATENT DOCUMENTS

| | | |
|---|---|---|
| 3,594,495 | 7/1971 | Bond . |
| 3,678,180 | 7/1972 | Bond . |
| 3,868,640 | 2/1975 | Binnie et al. . |
| 3,922,492 | 11/1975 | Lumsden . |
| 4,207,598 | 6/1980 | Reich et al. . |
| 4,245,245 | 1/1981 | Matsumoto et al. . |
| 4,264,924 | 4/1981 | Freeman . |
| 4,264,925 | 4/1981 | Freeman et al. . |
| 4,361,730 | 11/1982 | Barber et al. . |
| 4,450,477 | 5/1984 | Lovett . |
| 4,533,948 | 8/1985 | McNamara et al. . |
| 4,616,263 | 10/1986 | Eichelberger . |
| 4,757,497 | 7/1988 | Beierle et al. . |
| 4,787,085 | 11/1988 | Suto et al. . |
| 4,894,789 | 1/1990 | Yee . |
| 4,901,367 | 2/1990 | Nicholson . |
| 5,010,499 | 4/1991 | Yee .......................... 364/521 |
| 5,027,400 | 6/1991 | Baji et al. .......................... 380/20 |
| 5,027,426 | 6/1991 | Chiocca, Jr. . |
| 5,060,257 | 10/1991 | Penalver .......................... 379/100 |
| 5,073,931 | 12/1991 | Audebert et al. .......................... 380/23 |
| 5,077,607 | 12/1991 | Johnson et al. . |
| 5,089,885 | 2/1992 | Clark . |
| 5,093,718 | 3/1992 | Hoarty et al. . |
| 5,109,414 | 4/1992 | Harvey et al. .......................... 380/9 |
| 5,130,792 | 7/1992 | Tindell et al. . |
| 5,191,410 | 3/1993 | McCalley et al. . |
| 5,278,889 | 1/1994 | Papanicolaou et al. . |
| 5,329,308 | 7/1994 | Binns et al. . |
| 5,343,240 | 8/1994 | Yu . |
| 5,365,264 | 11/1994 | Inoue et al. . |
| 5,374,951 | 12/1994 | Welsh . |
| 5,379,421 | 1/1995 | Palazzi, III et al. . |
| 5,414,773 | 5/1995 | Handelman .......................... 380/10 X |
| 5,421,030 | 5/1995 | Baran . |
| 5,440,335 | 8/1995 | Beveridge . |
| 5,488,413 | 1/1996 | Elder et al. . |

FOREIGN PATENT DOCUMENTS

WO 87/04884  8/1987  WIPO .

OTHER PUBLICATIONS

A.L. Kaza, Cable/Telephony Possibilities, International Cable, Mar. 1993, pp. 52–ff.
S. Wittering, Cable Telecom UK, International Cable, Mar. 1993, pp. 46–51.
B.R. Clouston, Laws of Convergence: Impacting Cable's Future, International Cable, Mar. 1993, pp. 42–45.

(List continued on next page.)

*Primary Examiner*—Bernarr E. Gregory
*Attorney, Agent, or Firm*—Oppenheimer Poms Smith

[57] ABSTRACT

A CATV system including a CATV network, multiplicity of subscriber units, apparatus for transmitting over said CATV network encrypted information individually addressed to a subscriber unit and apparatus associated with each of said multiplicity of subscriber units for decoding the encrypted information addressed thereto.

75 Claims, 9 Drawing Sheets

FIG. 4

OTHER PUBLICATIONS

Telecommunications, IEEE Spectrum, Jan. 1993, pp. 38–41.

CEPT1 Line Interface, EXAR XR-T7288.

Wright, et al., An Evolutionary Approach to the Development of Two-Way Cable Technology, IEEE Transactions on Cable Television, vol. CATV-2, No. 1, pp. 52–61.

David G. Willard, A Time Division Multiple Access System for Digital Communication, Computer Design, Jun. 1974, pp. 79–83.

Ernest K. Smith, Pilot Two-Way CATV Systems, IEEE Transactions on Communications, vol. COM-23, No. 1, Jan. 1975, pp. 111–119.

Koji Maeda, Individualized Still-Picture Communication on a Two-Way Broad-Band CATV System, IEEE Transactions on Communications, vol. COM-23, No. 1, Jan. 1975, pp. 104–107.

Jeffrey R. Millar, et al., Methods for Supplying Interactive Services on Broad-Band Communication Networks, IEEE Transactions on Communications, vol. COM-23, No. 1, Jan. 1975, pp. 73–77.

Hiroshi Sato, Two-User Communication Channels, IEEE Transactions on Information Theory, vol. IT-23, No. 3, May 1977, pp. 295–304.

Robert J. Potter, Electronic Mail, Science, vol. 195, Mar. 1977, pp. 1160–1164.

Jan L. Bordewijk, On the Marriage of Telephone and Television, IEEE Transactions on Communications, vol. COM-23, No. 1, Jan. 1975, pp. 70–73.

Dietrich Becker, et al., Classification and Assessment of Telecommunication Services in Broad-Band Networks, IEEE Transactions on Communications, vol. COM-23, No. 1, Jan. 1975, pp. 63–69.

John J. Coyne, An Integrated Broad-Band Distribution System Using Demand Assignment, IEEE Transactions on Communications, vol. COM-23, No. 1, Jan. 1975, pp. 55–62.

A.G. Hare, et al., Multipurpose Wide-Band Local Distribution—Proposals for an Integrated System, IEEE Transactions on Communications, vol. COM-23, No. 1, Jan. 1975, pp. 42–48.

Paul Baran, Broad-Band Interactive Communication Services to the Home: Part 1: Potential Market Demand, IEEE Transactions on Communications, vol. COM-23, No. 1, Jan. 1975, pp. 5–15.

Paul Baran, Broad-Band Interactive Communication Services to the Home—Part II: Impasse, IEEE Transactions on Communications vol. COM-23, No. 1, Jan. 1975, pp. 178–184.

Tanaka, K., et al., "Multiplexing Documents on Facsimile Broadcasting," IEICE Transactions, v. E74, n. 9, pp. 2791–2797, 1991.

Bettac, H.D., et al., "Distribution of AMI/CPFSK-Modulated Data Across an Analog Satellite Standard TV Channel," Nachrichtentechnik Elektronic, v. 40, n. 4, pp. 122–127, 1990 (English translation as well as original German version).

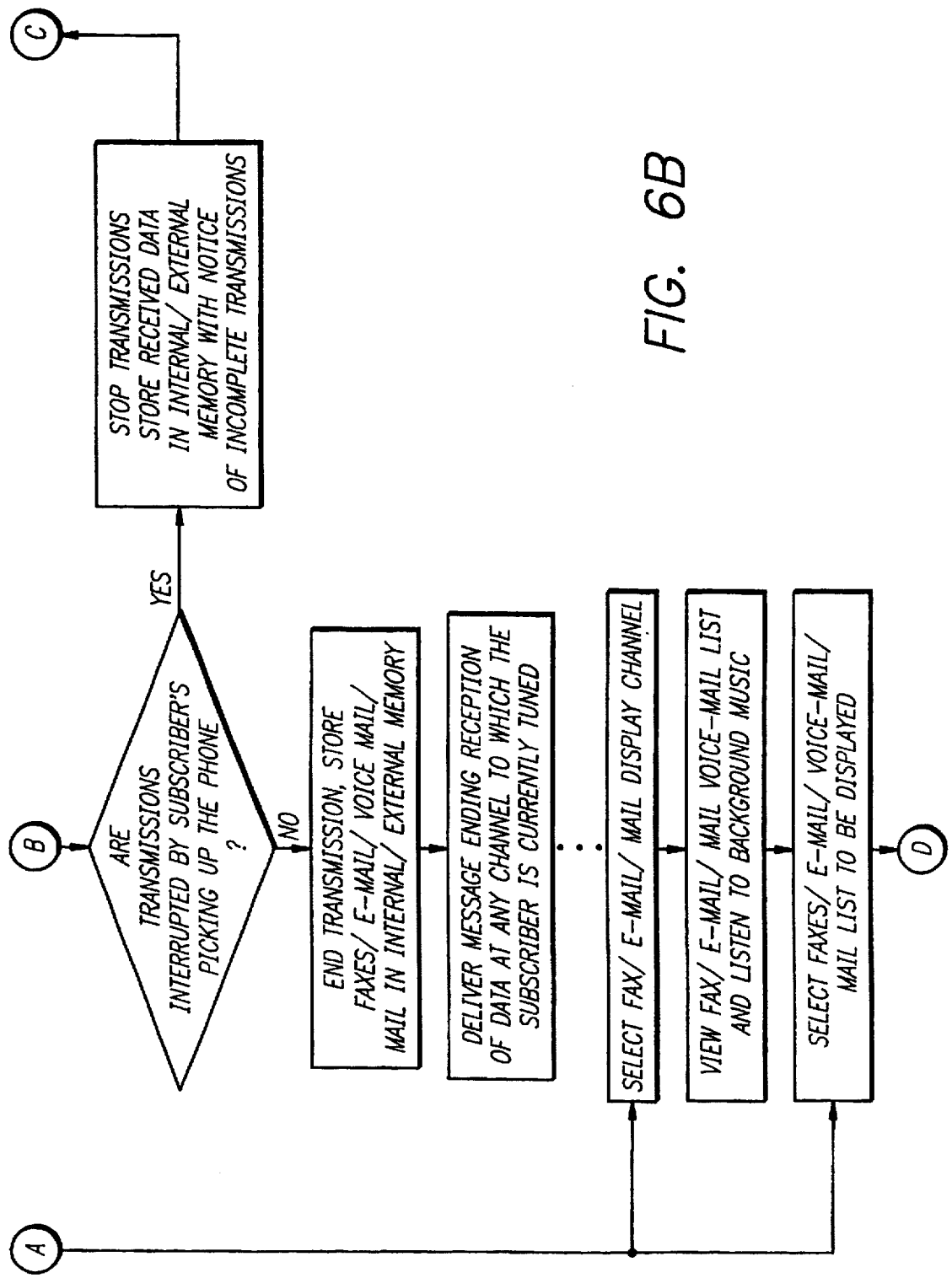

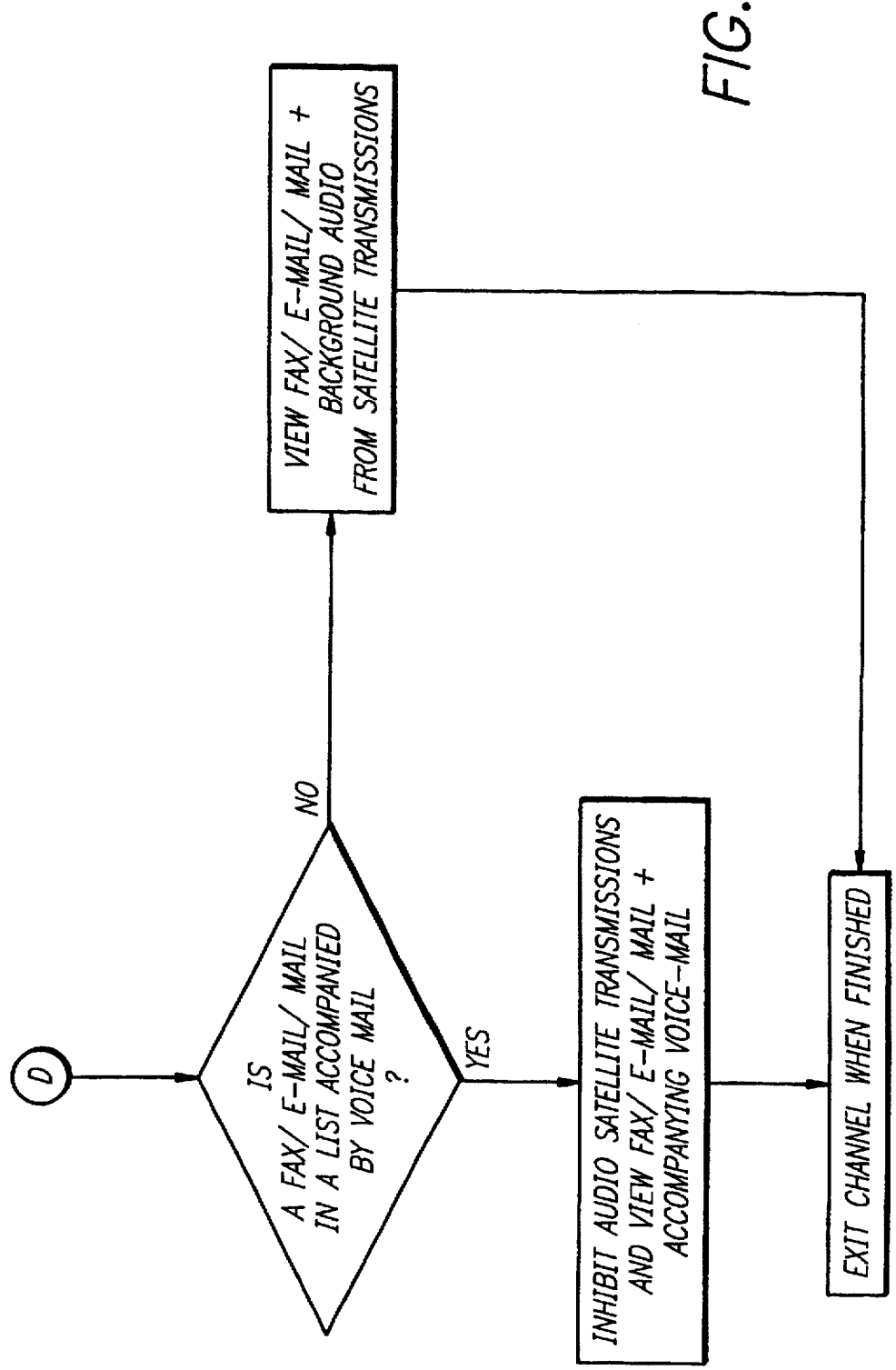

CATV SYSTEMS

This is a continuation application of Ser. No. 08/121,349, filed Sep. 15, 1993 now U.S. Pat. No. 5,414,773.

FIELD OF THE INVENTION

The present invention relates to CATV systems generally and more particularly to CATV systems which provide additional services to subscribers.

BACKGROUND OF THE INVENTION

Existing CATV systems employ radio-frequency (RF) links, such as cable and satellite links, or optical links using fiber-optic cables for transmission of TV program material. CATV systems which provide transmissions only from a headend to a plurality of subscribers are called one-way systems. CATV systems which additionally involve transmissions from subscribers' units are called two-way systems.

Some of the one-way systems also employ a telephone link for transmission of management data to the subscribers, while others transmit the management data via the RF or optical links.

Current two-way CATV systems transmit TV and audio programs via cable or satellite and receive data from subscriber units via telephone links. Such systems are hereinafter termed "combination telephone-radio frequency CATV" systems. The data received is mainly CATV subscriber viewing data, subscriber program ratings and the like.

In order to enable telephonic communications, the available CATV converters incorporate modem units which are directly coupled to existing telephone links.

Descriptions of prior art telephonic transponders which are also suitable for CATV systems may be found in several patents. For example, U.S. Pat. No. 3,922,492 to Lumsden describes a remote meter reading transponder which includes a modem. U.S. Pat. No. 3,868,640 to Binnie et al. describes a system for interrogating remote stations via an automatic dialer.

Neither the existing one-way CATV systems nor the two-way systems available today are used to provide services to subscribers. Although existing two-way systems employ telephonic modems, they are mainly used for communication management and for subscriber viewing data readout. Today, telephonic communication via a modem is mostly done at low data rates and for short periods over long intervals, thus leaving the telephonic modems unexploited for long periods.

In an article named "An Evolutionary Approach to the Development of Two-Way Cable Technology Communication" by J. B. Wright, M. P. Block and D. S. McVoy in IEEE Transactions on Cable Television, Vol. CATV-2, No. 1, January 1977, mention is made of proposed two-way CATV systems in which electronic automated newspaper, second class mail and on demand catalogs will be distributed to subscribers.

SUMMARY OF THE INVENTION

The present invention seeks to provide CATV systems having significant additional applications such as facsimile, electronic-mail (E-mail), voice-mail and mail. The term "CATV" is used throughout the specification and claims in an unusually broad sense to include cable television networks as well as satellite television and pay television generally. The term "mail" is used throughout the specification and claims in a broad sense to include any written or printed material such as the type which is usually delivered to households such as bills, credit card statements, advertising, messages from institutions etc. The term "mail" does not include CATV programming billing data and messages related to programming from CATV operators.

For the purposes of the present invention, the term "encrypt" in all of its forms will be used in a broader than usual sense to cover all forms of data encoding, ranging from simple scrambling or encoding to hard encryption.

There is thus provided in accordance with a preferred embodiment of the present invention a CATV system including:

a CATV network;

a multiplicity of subscriber units;

apparatus for transmitting over the CATV network encrypted information individually addressed to a subscriber unit; and apparatus associated with each of the multiplicity of subscriber units for decoding the encrypted information addressed thereto.

Additionally in accordance with a preferred embodiment of the present invention there is provided a CATV system including:

a CATV network;

a multiplicity of subscriber units;

apparatus for transmitting facsimile information over the CATV network; and a facsimile unit associated with at least one of the multiplicity of subscriber units for receiving facsimile information over the CATV network.

Further in accordance with a preferred embodiment of the present invention there is provided a CATV system including:

a CATV network;

a multiplicity of subscriber units;

apparatus for transmitting information over the CATV network; and a hard copy output unit for providing a hard copy output of information received via the CATV network.

Still further in accordance with a preferred embodiment of the present invention there is provided a CATV system including:

a CATV network;

a multiplicity of subscriber units;

apparatus for transmitting mail over the CATV network addressed to at least one subscriber unit; and apparatus associated with each of the multiplicity of subscriber units for receiving the mail addressed thereto.

Preferably each of the multiplicity of subscriber units includes a television and a CATV converter.

In accordance with a preferred embodiment of the present invention the CATV converter has associated therewith the apparatus for decoding the coded information addressed thereto.

Preferably the encrypted information includes scrambled information, which may be, for example, facsimile information, E-mail information, voice-mail information and mail.

It is appreciated that the features of the various embodiments described above may be combined in any suitable useful combination.

Preferably, the CATV system further includes:

a keyboard for entering information to be transmitted via a telephone link;

a processor for preparing the information in a format suitable for transmission over the telephone link; and a unit for transmitting over the telephone link at least one of mail, facsimile, electronic-mail and voice-mail information.

Additionally in accordance with a preferred embodiment of the present invention, the CATV system further includes a memory unit for storing at least one of mail, facsimile, electronic-mail and voice-mail information.

In accordance with a preferred embodiment of the invention, the CATV system additionally includes at each subscriber unit a processor for receiving the information in a format suitable for transmission over the telephone link and converting the information to a form which is suitable for output to a user.

Preferably, the processor includes a converter for converting the information to a form suitable for display on a television receiver. Additionally or alternatively, the processor includes a converter for converting the information to a form suitable for hard copy output.

Preferably, the processor includes a memory for storing information received via the telephone link.

Additionally in accordance with a preferred embodiment of the invention, there is provided a CATV transmission method for use with a CATV network and a multiplicity of subscriber units including the steps of:

transmitting over the CATV network encrypted information individually addressed to at least one subscriber unit; and at each of the multiplicity of subscriber units decoding the encrypted information addressed thereto.

Preferably the method also includes the step of decoding the encrypted information addressed to the subscriber unit.

Preferably the encrypted information includes scrambled information, which may be, for example, facsimile information, E-mail information, voice-mail information and mail.

Additionally in accordance with a preferred embodiment of the present invention there is provided a CATV transmission method for use with a CATV network and a multiplicity of subscriber units including:

transmitting facsimile information over the CATV network; and receiving facsimile information over the CATV network at at least one of the multiplicity of subscriber units.

Further in accordance with a preferred embodiment of the present invention there is provided a CATV transmission method for use with a CATV network and a multiplicity of subscriber units including:

transmitting information over the CATV network; and providing a hard copy output of information received via the CATV network.

Still further in accordance with a preferred embodiment of the present invention there is provided a CATV method for use with a CATV network and a multiplicity of subscriber units including:

transmitting mail over the CATV network addressed to at least one subscriber unit; and at each of the multiplicity of subscriber units receiving the mail addressed thereto.

It is appreciated that the features of the various methods described above may be combined in any suitable useful combination.

In accordance with a preferred embodiment of the present invention, the CATV network is a combination telephone-radio frequency CATV network.

Preferably, the CATV network is a two-way CATV network.

In accordance with a preferred embodiment of the present invention, the information is received via a telephone link. Preferably, the telephone link is the telephone link of the CATV network.

Preferably, the above methods also include the step of storing received information.

Preferably each subscriber unit receives the information in a format suitable for transmission over the telephone link and converts the information to a form which is suitable for output to a user.

In accordance with one embodiment of the present invention, each subscriber unit converts the information to a form suitable for display on a, television receiver. Alternatively or additionally, each subscriber unit converts the information to a form suitable for hard copy output.

Preferably, each subscriber unit stores information received via the telephone link.

BRIEF DESCRIPTION OF THE DRAWINGS

The present invention will be understood and appreciated more fully from the following detailed description, taken in conjunction with the drawings in which:

FIGS. 6A, 6B and 6C together provide a flow-chart description of the functionality of the apparatus of FIG. 5.

DETAILED DESCRIPTION OF PREFERRED EMBODIMENTS

Figure 1:
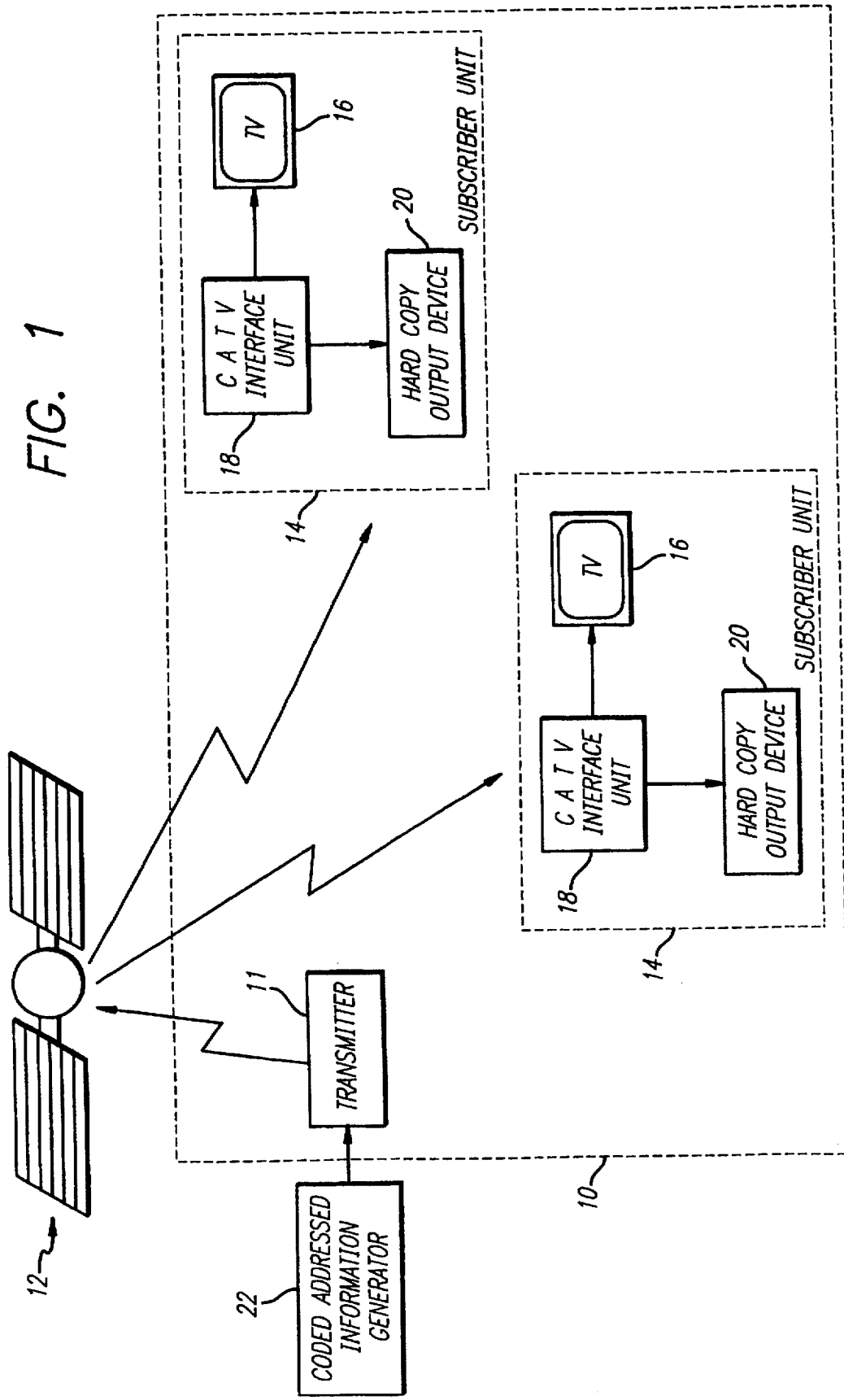
FIG. 1 is a generalized block diagram illustration of a CATV system constructed and operative in accordance with a preferred embodiment of the present invention.

Reference is now made to FIG. 1, which is a generalized block diagram illustration of a CATV system constructed and operative in accordance with a preferred embodiment of the present invention.

The CATV system includes or is used with a CATV network 10 which is typically, but not necessarily, a radio frequency (RF) network including a program transmitter 11 coupled through a satellite communication link 12 with a multiplicity of subscriber units 14. Alternatively, communication link 12 may be either a cable or a fiber-optic communication link.

Preferably, each of the multiplicity of subscriber units 14 includes a television 16 and a CATV interface unit 18. In accordance with a preferred embodiment of the invention, each subscriber unit may also include a hard copy output device 20. Preferably, hard copy output device 20 may be any suitable printer, such as a laser printer or thermal printer having graphics capability. The hard copy output device may be integrally formed as part of interface unit 18 or may be a stand-alone device connected thereto by a cable or wireless link.

The CATV interface unit 18 may include a conventional decoder which is commercially available from multiple vendors.

Conventional CATV data such as authorizations, program viewing data, etc. may be communicated to and from subscriber units 14 in a conventional manner. In accordance with a preferred embodiment of the present invention, there is provided a coded addressed information generator 22 for transmitting encrypted information to subscribers via the CATV system.

Coded addressed information generator 22 may comprise a fax generator, E-mail generator, voice mail generator, mail generator, or any other suitable information generator which is capable of providing information suitable for broadcast via the CATV system to subscribers. Generator 22 may include a scanner for inputting written or printed material and may receive information for broadcast directly form a computer or other data source. Generator 22 may comprise a facsimile machine. Generator 22 preferably provides the information in an encrypted form together with an address or addresses which identify one or more subscribers who are the intended recipients of the information.

Additionally in accordance with a preferred embodiment of the invention, the CATV interface unit 18 at each subscriber unit 14 includes an information decoder which is operative to decrypt only that information from generator 22 which is addressed thereto. It is to be noted that the addressing may be individual, i.e. to individual subscribers, or alternatively grouped, i.e. to subscribers fitting certain criteria, such as demographic or geographic criteria.

It is to be appreciated that the system of FIG. 1 may be provided without a hard copy output device 20 or alternatively without the coded addressed information generator 22 and corresponding decoder in the CATV interface unit.

One possible application of the system of FIG. 1 is in the transmission of bank statements or credit card statements. Instead of transmitting such statements by mail, as is common practice, such statements can be transmitted via the CATV systems at off-peak times, each addressed to a given subscriber, and each decrypted by the CATV interface unit 18 of the appropriate subscriber unit 14. The decrypted information may be stored in a suitable memory, which is either part of the subscriber unit 14 or attached thereto, and then viewed at will by the subscriber and/or produced in a hard copy form by means of the hard copy output device 20.

Another possible application of the system of FIG. 1 is in the transmission of "junk mail" such as grocery store advertisements. Instead of transmitting such material by mail or hand delivery, as is common practice, such material can be transmitted via the CATV systems at off-peak times, addressed to subscribers within a given geographical area, who may be further selected by demographic criteria.

In cases where the hard copy output device 20 is not provided, all of the above-mentioned functionalities operate with the exception of the provision of a hard copy output at the subscriber unit.

In cases where the encrypted addressed information generator 22 and corresponding decoder are not provided, but the hard copy output device is provided, the hard copy output device may be used to provide a hard copy output of any information received via the CATV network, using suitable buffers or memories, which may be part of the hard copy output device or separate therefrom. Such a system may be useful for providing permanent copies of freely broadcast material, which may be, for example, program material, educational material or commercial material.

Where a plurality of cable or fiber optics links having different areas of coverage are employed as opposed to a single satellite communication link, it is appreciated that different material or information may be transmitted along each of such links.

The material received via the CATV system is decrypted by the CATV interface unit 18 of the subscriber units 14 to which it is addressed. The decrypted material may be stored in a suitable memory, either in the subscriber unit 14 or attached thereto, and then viewed at will by the subscriber and/or produced in a hard copy form by means of the hard copy output device 20.

Figure 2:
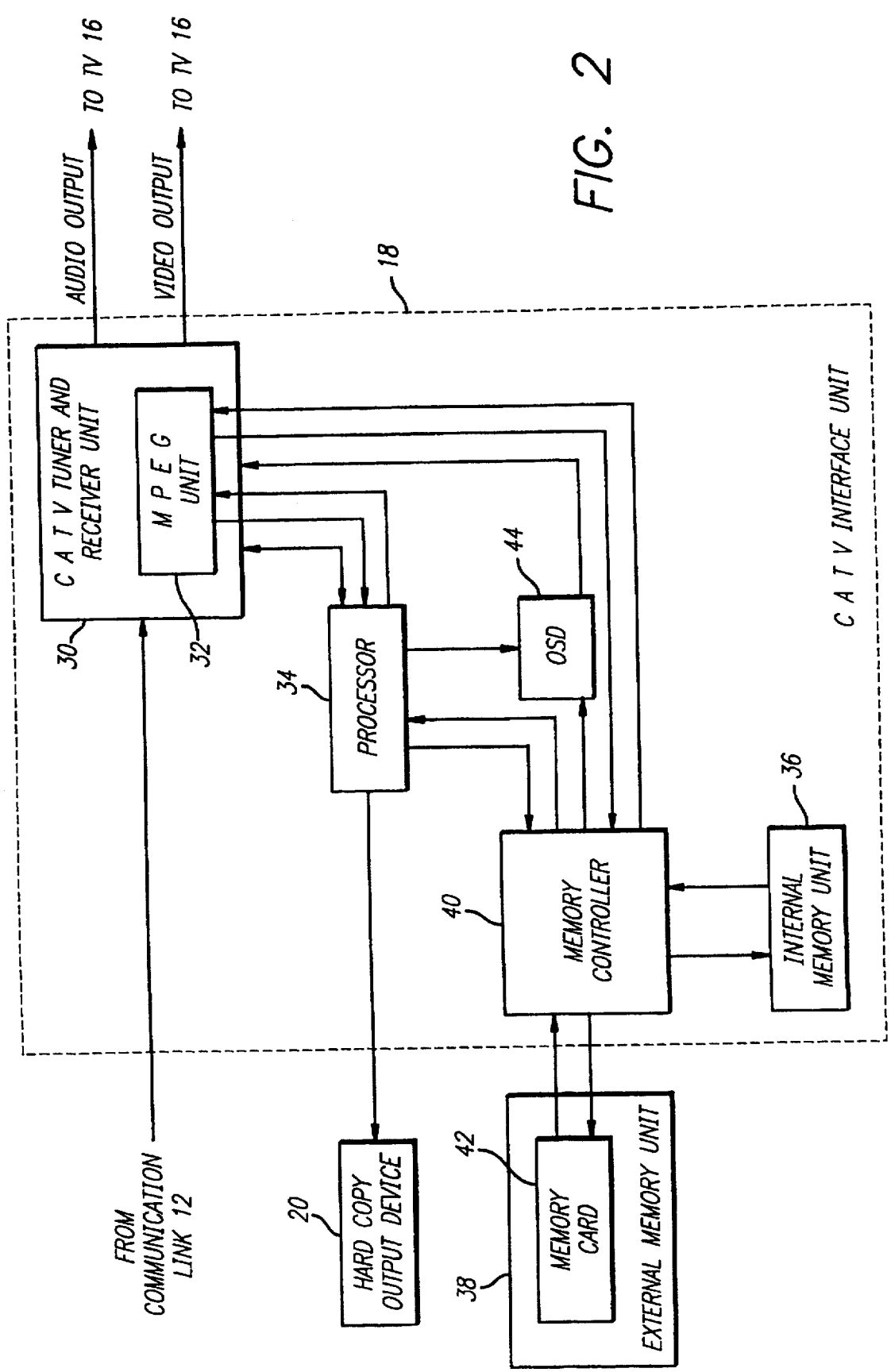
FIG. 2 is a generalized block diagram illustration of part of a subscriber unit constructed and operative in accordance with a preferred embodiment of the present invention.

Reference is now made to FIG. 2 which is a generalized block diagram illustration of CATV interface unit 18 which forms part of subscriber unit 14.

CATV interface unit 18 receives information, such as facsimile, electronic mail, voice mail and mail via communication link 12. This information is received by a CATV tuner and receiver unit 30 preferably including a compression/decompression unit 32, such as an MPEG unit. The information is transmitted directly or via unit 32 to a processor 34.

Processor 34 provides fax data, E-mail, voice-mail and mail data to either of an internal memory unit 36 or external memory unit 38 via a memory controller 40. Preferably, external memory unit 38 includes a memory card 42 and a memory card reader.

In many cases the incoming information arrives in compressed form. If the incoming information is not compressed it may be necessary to compress it before storage in the memory. In that case the compression/decompression unit 32 which is used for regular CATV digital video and audio compression/decompression may be used to provide the fax, E-mail, voice-mail and mail information to either of internal memory unit 36 or external memory unit 38 under the control of processor 34.

Stored faxes, E-mail, voice-mail and mail data are provided by either of the memories 36 and 38 to processor 34 via memory controller 40 and, in the case that the data was previously compressed by compression/decompression unit 32, via unit 32. The stored data may be then provided to an on-screen-display (OSD) unit 44. OSD unit 44 prepares the fax data, the E-mail data, the voice-mail data and the mail data in a format suitable for reception by a TV receiver and provides it to CATV tuner and receiver unit 30. In a preferred embodiment of the invention OSD unit 44 may be part of the CATV tuner and receiver unit 30. Alternatively, OSD unit 44 may be part of processor 34. In yet another preferred embodiment of the invention, processor 34 may be also part of the CATV tuner and receiver unit 30.

CATV tuner and receiver unit 30 also receives encrypted video and audio program transmissions from satellite or cable link 12 and provides decrypted video and audio data to TV 16 (FIG. 1). CATV tuner and receiver unit 30 may be operable upon receipt of suitable authorization from a headend (not shown).

Upon tuning the television receiver to an information display channel, such as a fax display channel or upon selection of a non-CATV data display option on a CATV remote control unit when the television receiver is tuned to any channel, CATV tuner and receiver unit 30 displays on the television receiver images of stored information, such as faxes, together with audio from communication link 12 or voice-mail, which accompanies the received information. The audio from link 12 may alternatively be any suitable background music.

At any time, prior to, during or after display of the received information on the TV, a hard copy thereof may be provided by hard copy output device 20.

Figure 3A:
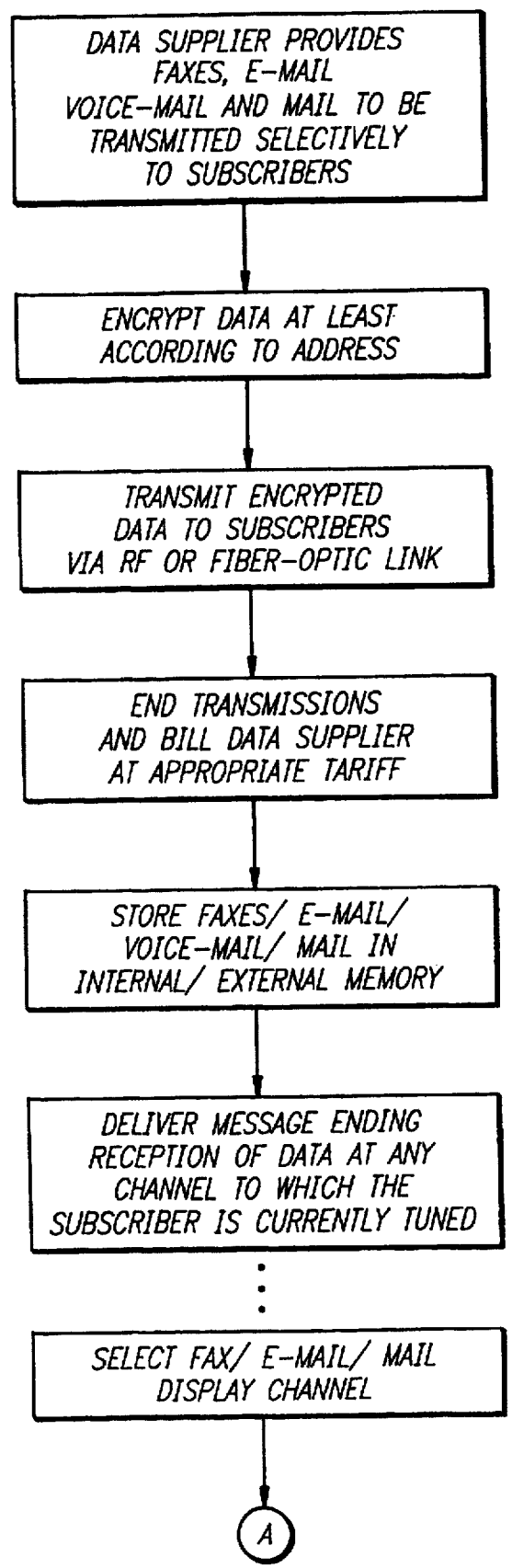
FIGS. 3A and 3B together provide a flow-chart description of the functionality of the apparatus of FIG. 2.
Figure 3B:
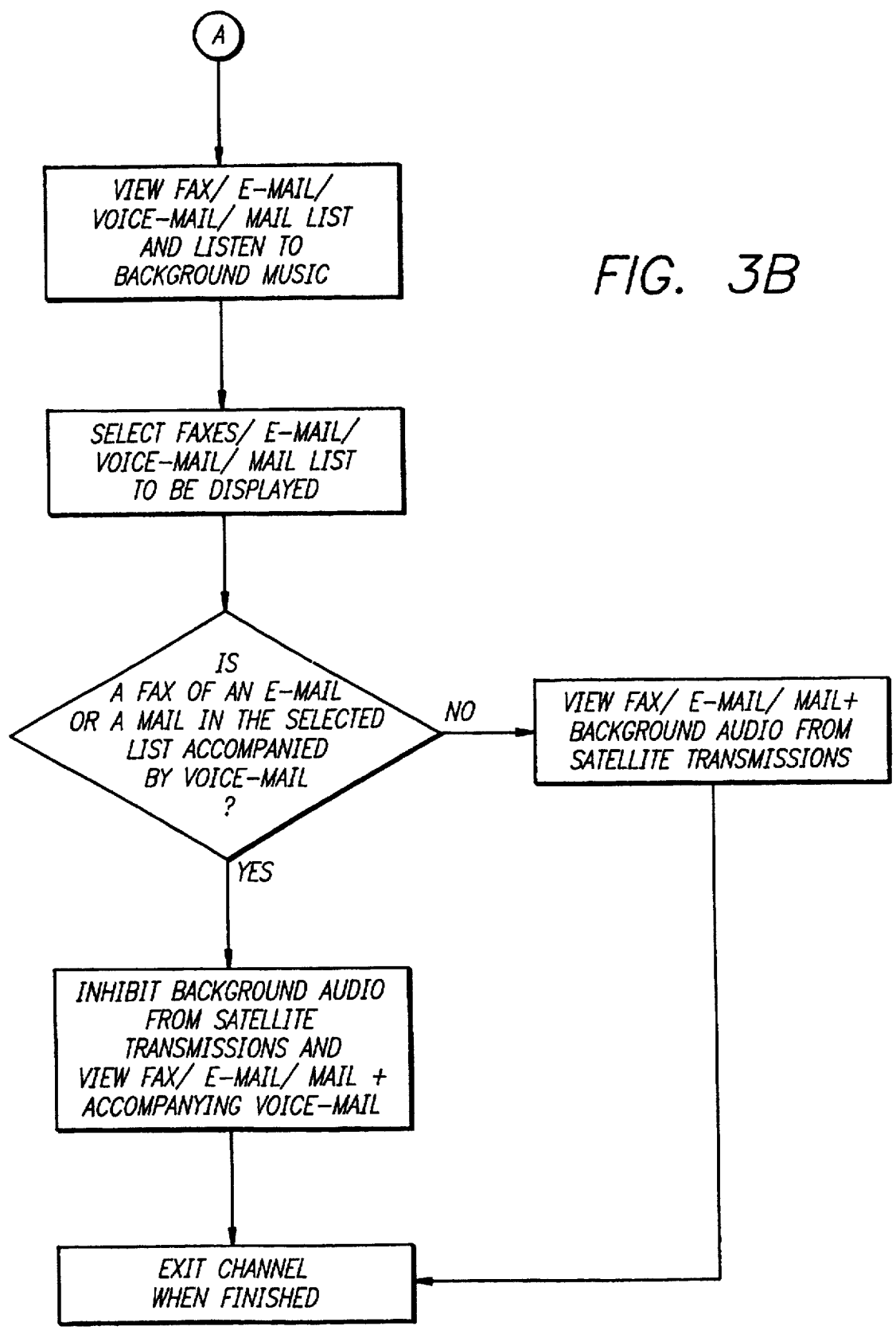

Reference is now made to FIGS. 3A and 3B which together provide a flow-chart description of the functionality of the apparatus of FIG. 2.

A data supplier provides faxes, E-mail, voice-mail and mail data to be transmitted selectively to subscribers by means of transmitter 11 (FIG. 1). The data is preferably encrypted at the transmitter such that only the addressee is able to decrypt the data. Alternatively, additional, more robust encryption techniques may be employed.

The encrypted data is transmitted to subscribers via the RF or fiber-optic communication link 12 (FIG. 1). If the data from the data supplier includes only visual data, accompanying audio programs or background music may be added at the transmitter. Alternatively, the visual data may be transmitted without accompanying audio. In a preferred embodiment of the invention the accompanying audio is scrambled.

If the data from data supplier includes visual data accompanied by voice-mail data then the visual data is transmitted with the accompanying voice-mail data.

When the data transmissions are terminated the data suppliers are billed at the appropriate tariff. Alternatively, under certain circumstances, the subscriber could be billed for the data transmission.

Usually, fax, E-mail, voice-mail and mail data is sent by service suppliers to promote their business. Such data is generally sent late at night when the usual CATV programming is terminated and transmission tariffs are low. However, data may also be transmitted during the day at higher tariffs.

After the data transmission is successfully completed the facsimile, E-mail and voice-mail data is stored in either of internal memory 36 or external memory 38 of CATV interface unit 18 (FIG. 2). The subscriber then receives a message confirming the reception of new data on a television receiver at any channel to which he is currently tuned.

Upon selecting a fax/E-mail CATV display channel on the television receiver the subscriber may view a fax/E-mail/mail/voice-mail list and listen to background music from CATV or cable transmissions. The subscriber is then able to select the fax/E-mail/mail/voice-mail data and messages he prefers to see by using a CATV remote control unit or the keyboard on the CATV interface unit 18.

If a fax, an E-mail or mail message is accompanied by a voice-mail message the subscriber is able to both view the fax, E-mail or mail and hear the voice-mail message at the same time. If, however, the fax, E-mail or mail is delivered without any accompanying voice message, the subscriber may be able to hear background music from the CATV satellite or cable transmissions.

Figure 4:
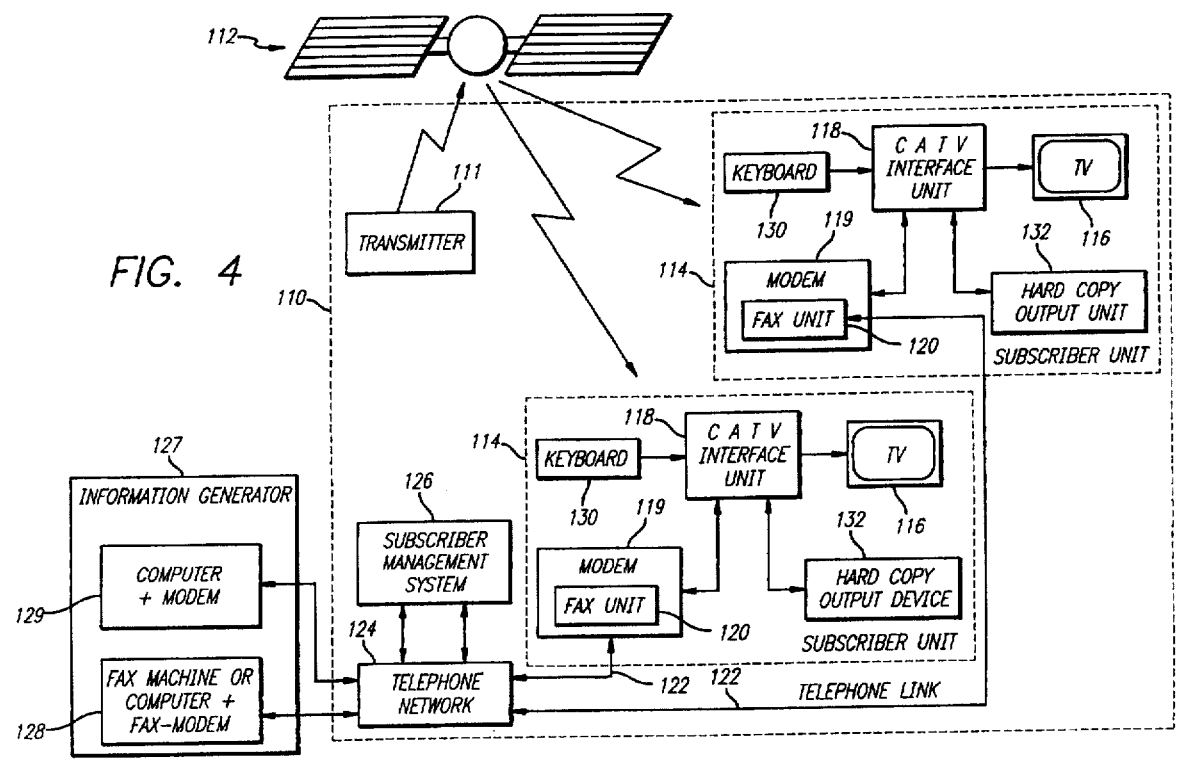
FIG. 4 is a generalized block diagram illustration of a CATV system constructed and operative in accordance with another preferred embodiment of the present invention.

Reference is now made to FIG. 4, which is a generalized block diagram illustration of a CATV system constructed and operative in accordance with another preferred embodiment of the present invention.

The CATV system includes or is used with a CATV network 110 which is typically a combination telephone—radio frequency (RF) network including a program transmitter 111 coupled through a satellite communication link 112 with a multiplicity of subscriber units 114. Alternatively, communication link 112 may be either a cable or a fiber-optic communication link.

Preferably, each of the multiplicity of subscriber units includes a television 116, a CATV interface unit 118 preferably having associated therewith a telephonic modem 119 and a receive-transmit fax unit 120. Preferably, fax unit 120 may be part of telephonic modem 119. In that case the telephonic modem and the fax unit are usually incorporated in a single electronic board which is called a "Fax-modem". Alternatively this need not be the case, and the fax unit may be a separate unit.

The CATV interface unit 118 may include a conventional decoder which is commercially available from multiple vendors. A fax-modem board may replace the standard modem board in the decoder and provide fax services as well as standard telephonic communications, E-mail, voice-mail and mail services. Fax-modem boards are commercially available from several vendors, such as the Everfax 24/96 2400 bps internal modem card w/9600 bps fax by EVEREX.

CATV interface units 118 may be connected, via the fax units 120 and via telephone links 122, to a standard telephone network 124 for voice, data and fax communications.

Conventional CATV data such as authorizations and program viewing data is communicated to and from a subscriber management system 126. Facsimile, E-mail, voice-mail and mail data may be provided to the subscriber units 114 via the CATV network from an information generator 127, such as a standard fax machine 128 or a computer and associated modem 129.

In a preferred embodiment of the invention the CATV interface unit 118 may be also associated with a keyboard 130 to produce faxes to be sent to either of fax machines or internal fax-modem cards via the CATV network.

Figure 5:
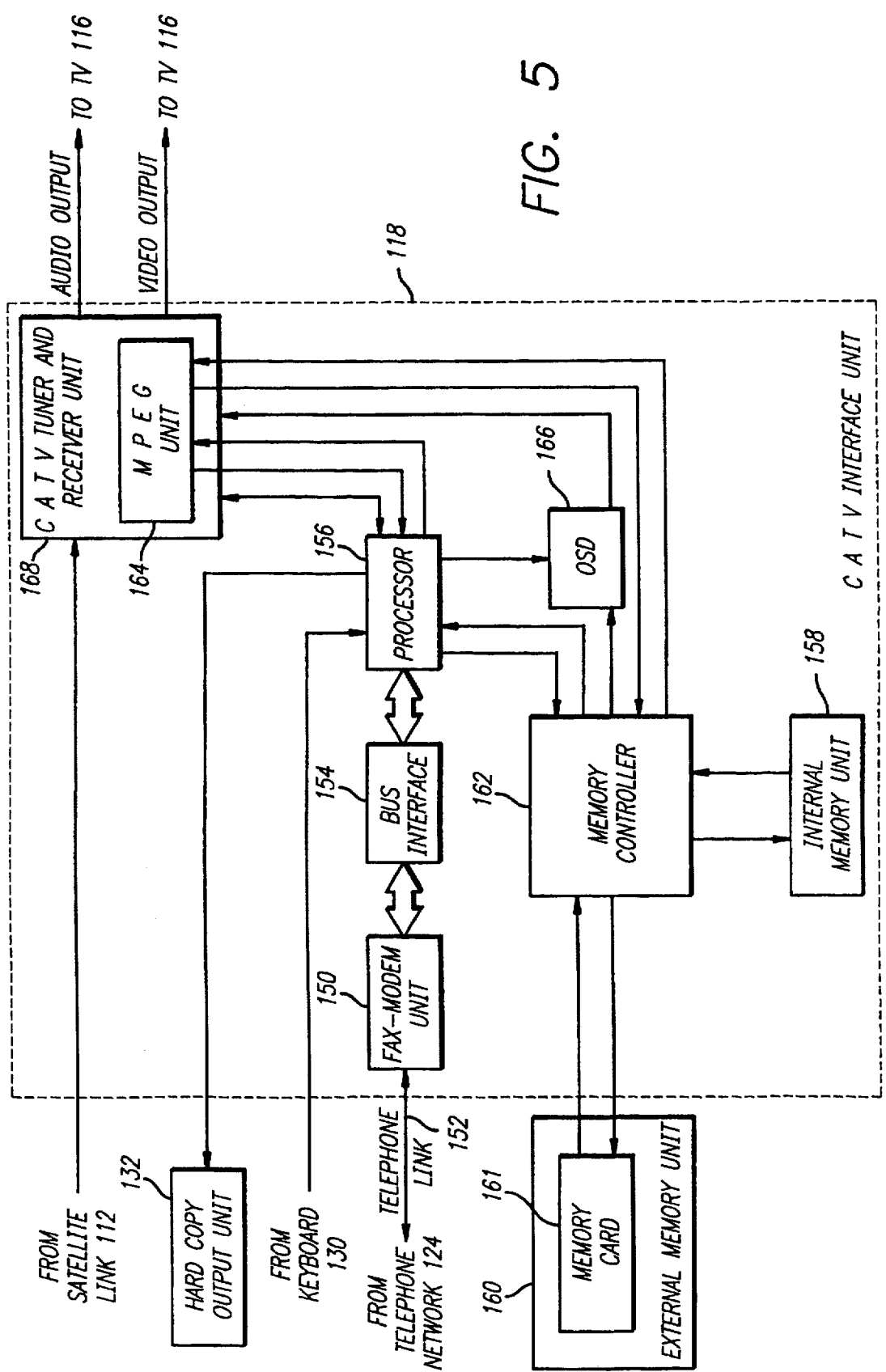
FIG. 5 is a generalized block diagram illustration of part of a subscriber unit constructed and operative in accordance with a preferred embodiment of the present invention.

Reference is now made to FIG. 5 which is a generalized block diagram illustration of CATV interface unit 118 which forms part of subscriber unit 114.

CATV interface unit 118 receives facsimile data, E-mail data, voice-mail data and mail data as well as communication management data from telephone network 124 (FIG. 4), forming of CATV network 110, via a receive-transmit fax-modem unit 150 and a standard telephone link 152. Fax-modem unit 150 provides data to a processor 156 via a communication BUS interface 154.

Processor 156 provides fax data, E-mail data, voice-mail data and mail data to either of an internal memory unit 158 or an external memory module 160 via a memory controller 162. Preferably, external memory unit 160 includes a memory card 161 and a memory card reader.

In a preferred embodiment of the invention processor 156 also receives data input by a subscriber via keyboard 130 (FIG. 4) and prepares it in a suitable format for transmission as fax, E-mail or mail data via telephone link 152. Processor 156 may also provide fax data, E-mail data, voice-mail data and mail data to hard copy output unit 132 for printout.

In many cases the fax-modem card already includes a compression/decompression standard unit for facsimile transmission and reception. If the fax data is not compressed at the fax-modem it may be necessary to compress it before storage in the memory. In that case the compression/decompression unit which is used for conventional CATV digital video and audio transmissions may be used, so that processor 156 provides the fax, E-mail, voice-mail and mail data to either of internal memory unit 158 or external memory module 160 via compression/decompression unit 164, preferably in the MPEG format, and via memory controller 162.

Stored faxes, E-mail, voice-mail and mail data are provided by either of the memories 158 or 160 to processor 156 via memory controller 162 and, in the case that the data was previously compressed by compression/decompression unit 164, via unit 164. The stored data is then provided to an on-screen-display (OSD) unit 166. OSD unit 166 prepares the fax data, the E-mail data, the voice-mail data and the mail data in a format suitable for reception by a TV receiver and provides it to CATV tuner and receiver unit 168. In a preferred embodiment of the invention OSD unit 166 may be part of the CATV tuner and receiver unit 168.

CATV tuner and receiver unit 168 also receives encrypted video and audio program transmissions from communication link 112 and provides decrypted video and audio data to TV 116. CATV tuner and receiver unit 168 is operable upon authorizations received from subscriber management system 126.

Upon tuning the television receiver to an information display channel, such as a fax display channel or upon selection of a non-CATV data display option on a CATV remote control unit when the television receiver is tuned to any channel, CATV tuner and receiver unit 168 displays on the television receiver images of stored information, such as faxes, together with audio from communication link 112 or voice-mail, which accompanies the received information. The audio from link 112 may alternatively be any suitable background music.

At any time, prior to, during or after display of the information on the TV, a hard copy thereof may be provided by hard copy output device 132.

Figure 6A:
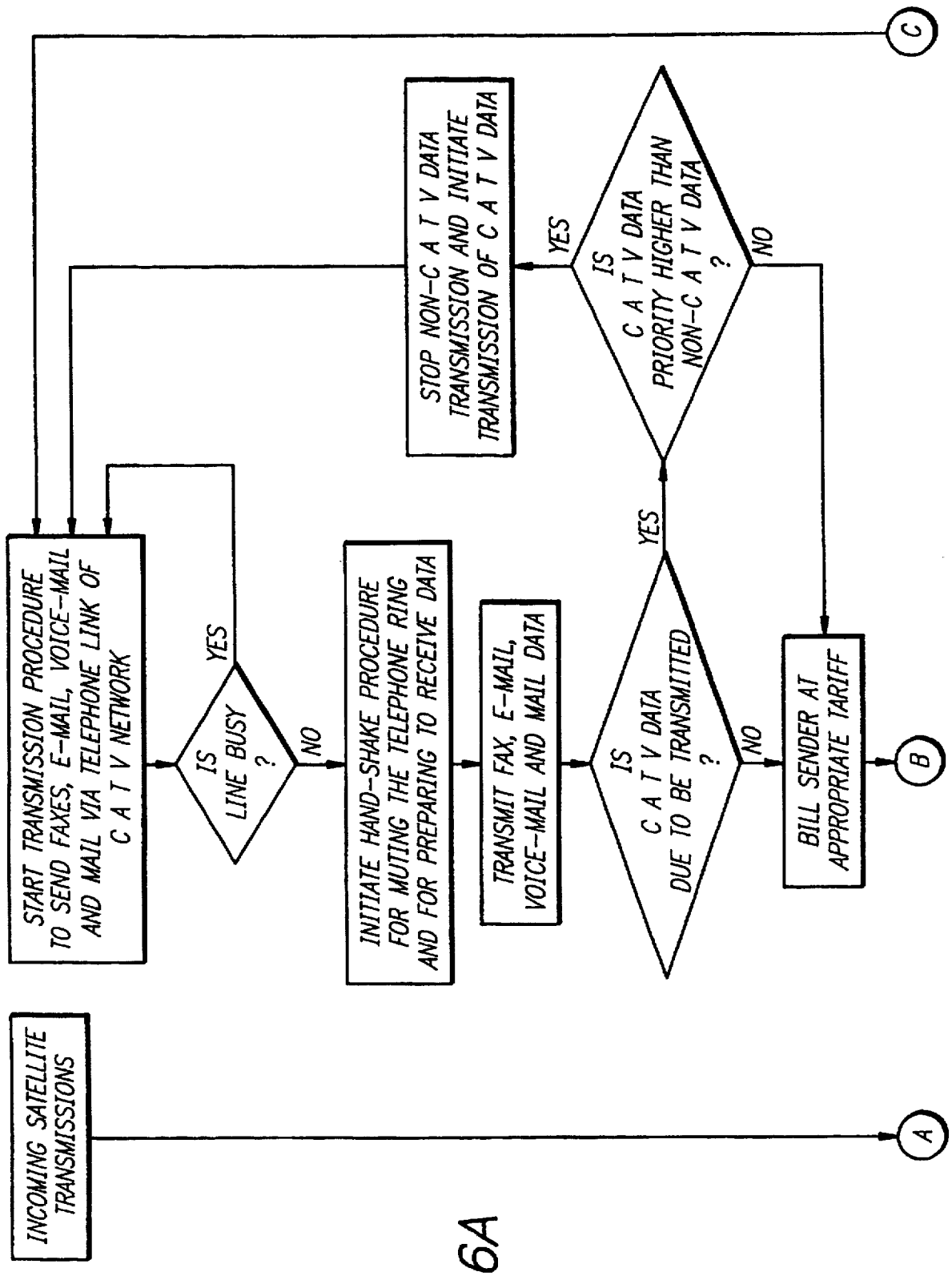

Reference is now made to FIGS. 6A, 6B and 6C which together provide a flow-chart description of the functionality of the apparatus of FIG. 5.

Faxes, E-mail, voice-mail and mail data are sent via the CATV network by a data supplier from one end of the telephonic communications link to a subscriber at the other end. At the same time conventional CATV programs are received by the subscriber. If the telephone line at the subscriber is busy at that time, the data is not sent. If however the line is free, a hand-shake procedure for muting the telephone ring is initiated and the data from the sender is transmitted to the subscriber. The sender is then billed at the appropriate tariff. Alternatively, in certain cases, the subscriber may be billed.

If the communication of faxes, E-mail, voice-mail and mail data occurs at the same time as the communication of CATV management data or subscriber's program viewing data, the CATV data receives priority over the other non-CATV data. However, on special occasions, if the non-CATV data is important it may be necessary to complete transmissions without interference. For such cases special priority codes are employed which are used with conventional telephonic data communications.

Generally, CATV data has higher priority than regular non-CATV data, and special non-CATV data has higher priority than CATV data. Therefore, the tariffs for special non-CATV data transmission are higher than the tariffs for regular non-CATV data transmission. Preferably, the priority codes are a digit having the value of 1—for regular non-CATV data transmissions, 2—for CATV data transmissions and 3—for special non-CATV data transmissions.

Usually, faxes, E-mail, voice-mail and mail data are sent by service providers to promote their business. Such data is generally sent late at night when the telephone lines are not likely to be busy and the tariffs are low. If, however, a service provider prefers to send data during the day he is billed at higher tariffs.

If the subscriber interrupts transmissions by picking up the telephone, the data transmissions are interrupted and the portion of the data which has been already transmitted is stored in either of internal memory module 158 or external memory module 160 (FIG. 5) together with a notice of incomplete transmission. The sender also receives such a message and consequently he will try to send the data later. This feature is similar to the fax transmission procedure between two fax-modems or fax machines.

After the data transmission is successfully completed the facsimile, E-mail, voice-mail and mail data is stored in either of internal memory 158 or external memory 160 (FIG. 5). The subscriber then receives a message confirming the reception of new data on a television receiver at any channel to which he is currently tuned.

Upon selecting a fax/E-mail CATV display channel the subscriber may view a fax/E-mail/voice-mail/mail list and listen to background music from CATV satellite or cable transmissions. The subscriber is then able to select from a list the faxes/E-mail/voice-mail/mail data and messages he prefers to see by using a CATV remote control unit or the keyboard on the CATV interface unit 118.

If a fax, an E-mail or an mail message is accompanied by a voice-mail message the subscriber is able to both view the fax and hear the voice-mail message at the same time. If, however, the fax or E-mail or mail is delivered without any voice message accompanying it, the subscriber may be able to hear background music from the CATV satellite or cable transmissions.

It will be appreciated by persons skilled in the art that the present invention is not limited by what has been particularly shown and described hereinabove. Rather the scope of the present invention is defined only by the claims which follow:

I claim:

1. A CATV system comprising:

a CATV network;

a compressor for compressing individually addressed information, individually addressed to a subscriber unit, to form individually addressed compressed information;

a transmitter for transmitting over the CATV network said individually addressed compressed information; and a multiplicity of subscriber units, each comprising:
- a receiver for receiving the individually addressed compressed information addressed thereto; and
- a decompressor for decompressing the individually addressed compressed information received at the receiver.

2. A system according to claim 1 and wherein each of said multiplicity of subscriber units also comprises:

a display for displaying decompressed information, decompressed at the decompressor;

a hard copy output unit for providing a hard copy output of said decompressed information; and a subscriber operated selector for selectably directing said decompressed information to at least one of said display and said hard copy output unit.

3. A system according to claim 1 and wherein each of said multiplicity of subscriber units also comprises:

an on-screen display circuit for preparing decompressed information, decompressed at the decompressor, in a format suitable for displaying on a display; and a display for displaying information, prepared at the on-screen display circuit.

4. A CATV system comprising:

a CATV network;

a transmitter for transmitting over the CATV network facsimile information addressed to at least a subscriber unit; and a multiplicity of subscriber units, each including:
- a receiver for receiving facsimile information addressed thereto;
- a compressor for compressing the facsimile information received at the receiver to form compressed facsimile information;
- a memory for storing said compressed facsimile information;
- a retrieval unit associated with said memory for retrieving, in response to a selection made by a subscriber, said compressed facsimile information from said memory;
- a decompressor for decompressing the compressed facsimile information; and
- an external output device for providing an output of the facsimile information decompressed at the decompressor.

5. A system according to claim 4 and wherein said memory includes an external removable memory.

6. A CATV system comprising:

a CATV network;

a transmitter for transmitting over the CATV network individually addressed information, individually addressed to a subscriber unit; and a multiplicity of subscriber units, each including:
- a receiver for receiving the individually addressed information addressed thereto;
- a compressor for compressing the individually addressed information received at the receiver to form compressed individually addressed information; and
- a memory for storing said compressed individually addressed information.

7. A system according to claim 6 and wherein said memory includes an external removable memory.

8. A system according to claim 6 and wherein said information includes at least one of mail information, E-mail information, voice-mail information and facsimile information.

9. A CATV system comprising:

a CATV network;

a transmitter for transmitting over the CATV network individually addressed information associated with a priority code determining a priority of transmission of said information to at least one subscriber unit; and a multiplicity of subscriber units, each including a receiver for receiving the information addressed thereto accordance with the determined priority of transmission.

10. A system according to claim 9 and wherein said transmitter includes a telephone transmitter and said receiver includes a telephone receiver.

11. A CATV system comprising:

a CATV network;

a transmitter for transmitting over the CATV network individually addressed non-audible information, individually addressed to a subscriber unit;

apparatus, associated with said transmitter, for transmitting audio to accompany said individually addressed non-audible information; and a multiplicity of subscriber units, each including:
- a receiver for receiving the individually addressed non-audible information and the audio accompanying said individually addressed non-audible information addressed thereto; and
- a display unit which displays the individually addressed non-audible information and plays the audio accompanying the individually addressed non-audible information received at the receiver.

12. A system according to claim 11 and wherein said information includes at least one of mail information, E-mail information and facsimile information.

13. A CATV method for use with a CATV network and a multiplicity of subscriber units, the method comprising:

compressing individually addressed information, individually addressed to a subscriber unit, to form individually addressed compressed information;

transmitting, over the CATV network, said individually addressed compressed information;

receiving, at at least one of the multiplicity of subscriber units, the individually addressed compressed information addressed thereto;

decompressing, at said at least one of the multiplicity of subscriber units, the individually addressed compressed information received thereat.

14. A method according to claim 13 and comprising:

displaying decompressed information, decompressed at said at least one of the multiplicity of subscriber units;

providing a hard copy output of the decompressed information; and selectably directing the decompressed information to at least one of a display unit and a hard copy output unit.

15. A method according to claim 13 and comprising:

preparing, at an on-screen display circuit, the information, decompressed at said at least one of the multiplicity of subscriber units, in a format suitable for displaying on a display; and displaying the information, prepared at the on-screen display circuit, on a display.

16. A CATV method for use with a CATV network and a multiplicity of subscriber units, the method comprising:

transmitting, over the CATV network, facsimile information addressed to at least a subscriber unit;

receiving, at at least one of the multiplicity of subscriber units, the facsimile information addressed thereto;

compressing the facsimile information received thereat to form compressed facsimile information;

storing said compressed facsimile information in a memory;

retrieving said compressed facsimile information from the memory in response to a selection made by a subscriber;

decompressing, at a decompressor, the compressed facsimile information retrieved from the memory; and providing an output of the facsimile information decompressed at the decompressor.

17. A CATV method for use with a CATV network and a multiplicity of subscriber units, the method comprising:

transmitting over the CATV network individually addressed information, individually addressed to a subscriber unit;

receiving, at each of said multiplicity of subscriber units, the individually addressed information addressed thereto;

compressing the individually addressed information, received at said each of said multiplicity of subscriber units, to form compressed individually addressed information; and storing said compressed individually addressed information.

18. A CATV method for use with a CATV network and a multiplicity of subscriber units, the method comprising:

transmitting over the CATV network individually addressed information associated with a priority code determining a priority of transmission of said information to at least one of said multiplicity of subscriber units; and receiving at said at least one of said multiplicity of subscriber units the information addressed thereto in accordance with the determined priority of transmission.

19. A CATV method for use with a CATV network and a multiplicity of subscriber units, the method comprising:

transmitting, at a transmitter, individually addressed non-audible information, individually addressed to a subscriber unit over the CATV network;

associating, at the transmitter, with said individually addressed non-audible information, audio to accompany said individually addressed non-audible information;

receiving, at at least one of said multiplicity of subscriber units, the individually addressed non-audible information and the audio accompanying said individually addressed non-audible information addressed thereto;

displaying, at said at least one of said multiplicity of subscriber units, the individually addressed non-audible information; and playing, at said at least one of said multiplicity of subscriber units, the audio accompanying the individually addressed non-audible information.

20. A CATV method for use with a CATV network and a multiplicity of subscriber units, the method comprising:

transmitting over the CATV network individually addressed information, individually addressed to a subscriber;

receiving, at at least one of said multiplicity of subscriber units, the individually addressed information; and displaying, on a television at said at least one of said multiplicity of subscriber units, a message confirming the reception of said individually addressed information at any channel to which the subscriber is tuned at the time the reception of said individually addressed information is terminated.

21. A CATV system comprising:

a CATV network;

a multiplicity of subscriber units each including a television and a CATV converter;

apparatus for transmitting electronic mail information over said CATV network, wherein at least some of said multiplicity of subscriber units include:

apparatus for receiving said electronic mail information over said CATV network;

a memory for storing said electronic mail information; and a retrieval unit associated with said memory for retrieving said electronic mail information from said memory whereby said electronic mail information from said memory passes through said CATV converter and is at least partially displayed on said television.

22. A subscriber unit to be employed with a CATV system in which individually addressed information, individually addressed to the subscriber unit, is compressed to form individually addressed compressed information prior to transmission by a transmitter over a CATV network, the subscriber unit comprising:

a receiver for receiving the individually addressed compressed information addressed thereto; and a decompressor for decompressing the individually addressed compressed information received at the receiver.

23. A subscriber unit according to claim 22 and comprising a display for displaying decompressed information which is decompressed at the decompressor.

24. A subscriber unit according to claim 22 and comprising a memory for storing said individually addressed compressed information after receiving at said receiver.

25. A subscriber unit according to claim 22 and wherein said information comprises at least one of electronic mail information, facsimile information, voice-mail information and mail information.

26. A subscriber unit to be employed with a CATV system in which individually addressed information, individually addressed to the subscriber unit, is compressed and encrypted to form individually addressed encrypted and compressed information prior to transmission by a transmitter over a CATV network, the subscriber unit comprising:

a receiver for receiving the individually addressed encrypted and compressed information addressed thereto;

a decrypter for decrypting the individually addressed encrypted and compressed information to form individually addressed compressed information; and a decompressor for decompressing the individually addressed compressed information.

27. A subscriber unit to be employed with a CATV system in which individually addressed information associated with a priority code determining a priority of transmission of said information, individually addressed to the subscriber unit, is transmitted over a CATV network, the subscriber unit comprising:

a receiver for receiving the individually addressed information addressed thereto in accordance with said priority of transmission;

a memory for storing said individually addressed information;

a display for displaying at least part of said individually addressed information retrieved from said memory; and an on-screen display circuit for preparing said information in a format suitable for displaying on said display.

28. A method of providing individually addressed information in a subscriber unit which is employed with a CATV system in which the individually addressed information is compressed to form individually addressed compressed information prior to transmission by a transmitter over a CATV network, the method comprising:

receiving the individually addressed compressed information at a receiver in the subscriber unit; and decompressing, at a decompressor in the subscriber unit, the individually addressed compressed information received at the receiver.

29. A method according to claim 28 and comprising displaying, on a display, information which is decompressed at the decompressor.

30. A method according to claim 28 and comprising storing, at a memory, said individually addressed compressed information after receiving at said receiver.

31. A CATV method comprising:
    providing a CATV network and a multiplicity of subscriber units;
    compressing, at a headend, individually addressed information, which is individually addressed to a subscriber unit, to form individually addressed compressed information;
    transmitting over said CATV network said individually addressed compressed information;
    receiving said individually addressed compressed information at said subscriber unit;
    storing said individually addressed compressed information at a memory;
    retrieving said individually addressed compressed information from said memory;
    decompressing said individually addressed compressed information retrieved from said memory to form individually addressed information; and
    displaying at least part of said individually addressed information on a display.

32. A CATV method comprising:
    providing a CATV network and a multiplicity of subscriber units;
    transmitting over said CATV network individually addressed information associated with a priority code determining a priority of transmission of said information to at least one of said multiplicity of subscriber units;
    receiving said individually addressed information at a subscriber unit in accordance with said priority code;
    storing said individually addressed information at a memory at said subscriber unit;
    retrieving said individually addressed information from said memory;
    preparing, said individually addressed information retrieved from said memory in a format suitable for displaying on a display; and
    displaying at least part of said individually addressed information on said display.

33. A subscriber unit for use with a CATV system in which individually addressed voice-mail information associated with a priority code determining a priority of transmission of said information, individually addressed to the subscriber unit, is transmitted to the subscriber unit over a CATV network, the subscriber unit comprising:
    a receiver for receiving the individually addressed voice-mail information addressed thereto in accordance with said priority code;
    a memory for storing said individually addressed voice-mail information; and
    a display for displaying at least part of said individually addressed voice-mail information retrieved from said memory.

34. A subscriber unit for use with a CATV system in which individually addressed information, individually addressed to the subscriber unit, is transmitted to the subscriber unit over a CATV network, the subscriber unit comprising:
    a CATV converter;
    apparatus for receiving said individually addressed information over said CATV network;
    a memory for storing said individually addressed information; and
    a retrieval unit associated with said memory for retrieving said individually addressed information from said memory whereby said individually addressed information from said memory passes through said CATV converter and is at least partially displayed on a television.

35. A subscriber unit according to claim 34 and wherein said individually addressed information is encrypted.

36. A subscriber unit according to claim 34 and wherein said individually addressed information includes electronic mail information.

37. A subscriber unit according to claim 34 and wherein said individually addressed information includes voice-mail information.

38. A subscriber unit according to claim 34 and wherein said individually addressed information includes mail information.

39. A subscriber unit according to claim 34 and wherein said individually addressed information includes facsimile information.

40. A subscriber unit for use with a combination telephone-radio frequency CATV system in which individually addressed information, individually addressed to the subscriber unit, is transmitted to the subscriber unit over a combination telephone-radio frequency CATV network, the subscriber unit comprising:
    a receiver for receiving the individually addressed information addressed thereto via a telephone link;
    a memory for storing said individually addressed information; and
    a display for displaying at least part of said individually addressed information retrieved from said memory.

41. A subscriber unit according to claim 40 and wherein said individually addressed information includes electronic mail information.

42. A subscriber unit according to claim 40 and wherein said individually addressed information includes voice-mail information.

43. A subscriber unit according to claim 40 and wherein said individually addressed information includes mail information.

44. A subscriber unit according to claim 40 and wherein said individually addressed information includes facsimile information.

45. A subscriber unit according to claim 40 and also comprising:
    a keyboard for entering information to be transmitted via a telephone link;
    a processor for preparing said information to be transmitted via said telephone link in a format suitable for transmission over said telephone link; and
    a unit for transmitting over said telephone link at least one of mail, facsimile, electronic-mail and voice-mail information.

46. A subscriber unit for use with a combination telephone-radio frequency CATV system in which individually addressed information, individually addressed to the subscriber unit, is transmitted to the subscriber unit over a combination telephone-radio frequency CATV network, the subscriber unit comprising:
    apparatus for receiving said individually addressed information over said CATV network;

a memory for storing said individually addressed information;

a retrieval unit associated with said memory for retrieving said individually addressed information from said memory and for providing an output of said individually addressed information to an external output device;

a keyboard for entering information to be transmitted via a telephone link;

a processor for preparing said information to be transmitted via a telephone link in a format suitable for transmission over said telephone link; and a unit for transmitting over said telephone link at least one of mail, facsimile, electronic-mail and voice-mail information.

47. A subscriber unit according to claim 46 and wherein said individually addressed information includes facsimile information.

48. A subscriber unit according to claim 46 and wherein said individually addressed information includes electronic mail information.

49. A subscriber unit according to claim 46 and wherein said individually addressed information includes voice-mail information.

50. A subscriber unit according to claim 46 and wherein said individually addressed information includes mail information.

51. A subscriber unit for use with a combination telephone-radio frequency CATV system in which information is transmitted to the subscriber unit over a combination telephone-radio frequency CATV network, the subscriber unit comprising:

a display;

a hard copy output unit for providing a hard copy output of information received via the CATV network;

a subscriber operated selector for selectably directing information received at the subscriber unit to at least one of said display and said hard copy output unit;

a keyboard for entering information to be transmitted via a telephone link;

a processor for preparing said information to be transmitted via a telephone link in a format suitable for transmission over said telephone link; and a unit for transmitting over said telephone link at least one of mail, facsimile, electronic-mail and voice-mail information.

52. A subscriber unit for use with a combination telephone-radio frequency CATV system in which individually addressed information, individually addressed to the subscriber unit, is transmitted to the subscriber unit over a combination telephone-radio frequency CATV network, the subscriber unit comprising:

a receiver for receiving the individually addressed information addressed thereto;

a memory for storing said individually addressed information;

a display for displaying at least part of said individually addressed information retrieved from said memory; and a processor for receiving said information in a format suitable for transmission over a telephone link, said processor includes a converter for converting said information to a form suitable for display on a television receiver.

53. A subscriber unit for use with a combination telephone-radio frequency CATV system in which individually addressed information, individually addressed to the subscriber unit, is transmitted to the subscriber unit over a combination telephone-radio frequency CATV network, the subscriber unit comprising:

a receiver for receiving the individually addressed information addressed thereto;

a memory for storing said individually addressed information;

a display for displaying at least part of said individually addressed information retrieved from said memory; and a processor for receiving said information in a format suitable for transmission over a telephone link, said processor includes a memory for storing information received via said telephone link.

54. A subscriber unit for use with a CATV system in which individually addressed information, individually addressed to the subscriber unit, is transmitted to the subscriber unit over a CATV network, the subscriber unit comprising:

a receiver for receiving the individually addressed information addressed thereto;

an external removable memory for storing said individually addressed information; and a display for displaying at least part of said individually addressed information retrieved from said memory.

55. A subscriber unit according to claim 54 and wherein said individually addressed information includes mail information.

56. A subscriber unit according to claim 54 and wherein said individually addressed information includes electronic mail information.

57. A subscriber unit according to claim 54 and wherein said individually addressed information includes facsimile information.

58. A subscriber unit according to claim 54 and wherein said individually ed information includes voice-mail information.

59. A subscriber unit for use with a CATV system in which individually addressed non-audible information, individually addressed to the subscriber unit, and audio accompanying said individually addressed non-audible information, are transmitted to the subscriber unit over a CATV network, the subscriber unit comprising:

a receiver for receiving the individually addressed non-audible information and the audio accompanying said individually addressed non-audible information addressed thereto; and a display unit which displays the individually addressed non-audible information and plays the audio accompanying the individually addressed non-audible information received at the receiver.

60. A CATV method for use with a combination telephone-radio frequency CATV network and a subscriber unit, the method comprising:

transmitting, over the CATV network, individually addressed information, individually addressed to the subscriber unit;

receiving, at the subscriber unit, the individually addressed information, addressed thereto via a telephone link;

storing, at a memory at the subscriber unit, said individually addressed information; and displaying, at the subscriber unit, at least part of said individually addressed information retrieved from said memory.

61. A CATV method according to claim 60 and also comprising:
    inputting, at the subscriber unit, information to be transmitted via a telephone link;
    preparing, at the subscriber unit, said information to be transmitted via a telephone link in a format suitable for transmission over said telephone link; and
    transmitting over said telephone link at least one of mail, facsimile, electronic-mail and voice-mail information.

62. A CATV method according to claim 60 and also comprising providing, at the subscriber unit, a message indicating end of reception of said individually addressed information at any channel to which the subscriber is tuned at the time the reception of said individually addressed information is terminated.

63. A CATV method for use with a combination telephone-radio frequency CATV network and a multiplicity of subscriber units comprising:
    transmitting voice-mail information over said CATV network; and
    receiving voice-mail information over said CATV network at at least one of said multiplicity of subscriber units via a telephone link in a format suitable for transmission over said telephone link and converting said voice-mail information to a form suitable for playing via a television receiver.

64. A CATV method according to claim 63 and also comprising providing, at said at least one of said multiplicity of subscriber units, a message indicating end of reception of said voice-mail information at any channel to which said at least one of said multiplicity of subscriber units is tuned at the time the reception of said voice-mail information is terminated.

65. A CATV method for use with a combination telephone-radio frequency CATV network and a multiplicity of subscriber units comprising:
    transmitting mail information over said CATV network; and
    receiving mail information over said CATV network at at least one of said multiplicity of subscriber units via a telephone link in a format suitable for transmission over said telephone link and converting said mail information to a form suitable for display on a television receiver.

66. A CATV method according to claim 65 and also comprising providing, at said at least one of said multiplicity of subscriber units, a message indicating end of reception of said mail information at any channel to which said at least one of said multiplicity of subscriber units is tuned at the time the reception of said mail information is terminated.

67. A CATV method for use with a combination telephone-radio frequency CATV network and a multiplicity of subscriber units comprising:
    transmitting electronic mail information over said CATV network; and
    receiving electronic mail information over said CATV network at at least one of said multiplicity of subscriber units via a telephone link in a format suitable for transmission over said telephone link and converting said electronic mail information to a form suitable for display on a television receiver.

68. A CATV method according to claim 67 and also comprising providing, at said at least one of said multiplicity of subscriber units, a message indicating end of reception of said electronic mail information at any channel to which said at least one of said multiplicity of subscriber units is tuned at the time the reception of said electronic mail information is terminated.

69. A CATV method for use with a combination telephone-radio frequency CATV network and a subscriber unit comprising:
    receiving, at said subscriber unit, individually addressed information over said CATV network;
    storing, at a memory at said subscriber unit, said individually addressed information;
    retrieving said individually addressed information from said memory;
    providing an output of the individually addressed information retrieved from said memory to an external output device;
    inputting information to be transmitted via a telephone link;
    preparing said information to be transmitted via a telephone link in a format suitable for transmission over said telephone link; and
    transmitting over said telephone link at least one of mail, facsimile, electronic-mail and voice-mail information.

70. A CATV method for use with a combination telephone-radio frequency CATV network and a subscriber unit comprising:
    providing a display at the subscriber unit;
    outputting to a hard copy output unit information received via the CATV network;
    selectably directing information received at the subscriber unit to at least one of said display and said hard copy output unit;
    inputting information to be transmitted via a telephone link;
    preparing said information to be transmitted via a telephone link in a format suitable for transmission over said telephone link; and
    transmitting over said telephone link at least one of mail, facsimile, electronic-mail and voice-mail information.

71. A CATV method for use with a combination telephone-radio frequency CATV network and a subscriber unit comprising:
    receiving, at the subscriber unit, individually addressed information addressed thereto;
    storing, at a memory at said subscriber unit, said individually addressed information;
    displaying at least part of said individually addressed information retrieved from said memory;
    receiving, at a processor at said subscriber unit, said individually addressed information in a format suitable for transmission over a telephone link; and
    converting said individually addressed information to a form suitable for display on a television receiver.

72. A CATV method for use with a combination telephone-radio frequency CATV network and a subscriber unit comprising:
    receiving, at the subscriber unit, individually addressed information addressed thereto;
    storing, at a memory at said subscriber unit, said individually addressed information;
    displaying at least part of said individually addressed information retrieved from said memory;
    receiving, at a processor at said subscriber unit, said individually addressed information in a format suitable for transmission over a telephone link; and
    storing information received via said telephone link.

73. A CATV method for use with a CATV network and a subscriber unit, wherein individually addressed voice-mail information associated with a priority code determining a priority of transmission of said information is transmitted to the subscriber unit over the CATV network, the method comprising:

- receiving, at the subscriber unit, the individually addressed voice-mail information, addressed thereto in accordance with said priority of transmission;
- storing, at a memory at the subscriber unit, said individually addressed voice-mail information; and
- displaying, at the subscriber unit, at least part of said individually addressed voice-mail information retrieved from said memory.

74. A CATV method for use with a CATV network and a subscriber unit, the method comprising:

- providing a CATV converter;
- receiving, at the subscriber unit, individually addressed information, addressed to the subscriber unit over said CATV network;
- storing, at a memory at the subscriber unit, said individually addressed information;
- retrieving said individually addressed information from said memory;
- passing said individually addressed information retrieved from said memory through said CATV converter; and
- displaying at least part of the individually addressed information on a television.

75. A CATV method for use with a combination telephone-radio frequency CATV network and a multiplicity of subscriber units comprising:

- transmitting facsimile information over said CATV network;
- receiving facsimile information over said CATV network at at least one of said multiplicity of subscriber units via a telephone link in a format suitable for transmission over said telephone link;
- converting said facsimile information to a form suitable for display on a television receiver; and
- providing, at said at least one of said multiplicity of subscriber units, a message indicating end of reception of said facsimile information at any channel to which said at least one of said multiplicity of subscriber units is tuned at the time the reception of said facsimile information is terminated.

* * * * *

UNITED STATES PATENT AND TRADEMARK OFFICE
CERTIFICATE OF CORRECTION

PATENT NO. : 5,715,315
DATED : February 3, 1998
INVENTOR(S) : Doron Handelman

It is certified that error appears in the above-indentified patent and that said Letters Patent is hereby corrected as shown below:

Title page, Assignee: News Datacom Ltd., London, England-- should be inserted.

Signed and Sealed this

Seventh Day of July, 1998

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,715,315
DATED : February 3, 1998
INVENTOR(S) : Doron Handelman

It is certified that error appears in the above-identified patent and that said Letters Patent is hereby corrected as shown below:

On the title page, item [56], insert the following:

U. S. PATENT DOCUMENTS

| EXAMINER INITIAL | PATENT NUMBER | ISSUE DATE | PATENTEE | CLASS | SUBCLASS | FILING DATE IF APPROPRIATE |
|---|---|---|---|---|---|---|
| | 4,908,859 | 03/13/90 | BENNETT, ET AL. | 380 | 10 | 1/22/88 |
| | | | | | | |
| | | | | | | |
| | | | | | | |
| | | | | | | |
| | | | | | | |
| | | | | | | |
| | | | | | | |

Signed and Sealed this

Sixth Day of July, 1999

Attest:

Q. TODD DICKINSON

Attesting Officer

Acting Commissioner of Patents and Trademarks